Figure 1:
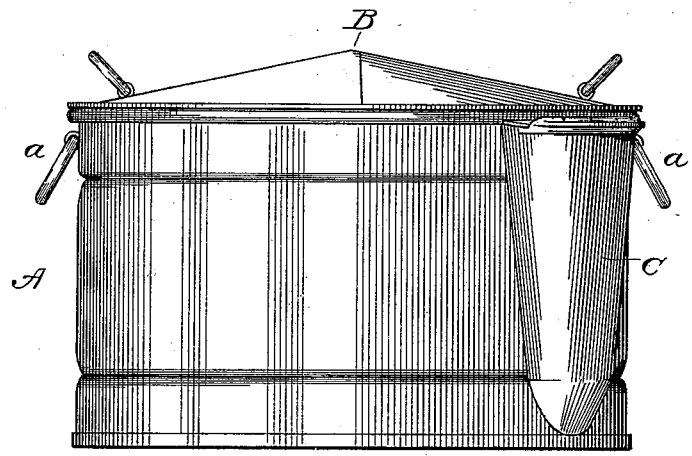

(No Model.) 2 Sheets—Sheet 1.

E. A. REED.
COMBINED STEAMER AND ROASTER.

No. 374,755. Patented Dec. 13, 1887.

Witnesses:

Inventor:
Elizabeth A. Reed,
by
her Attorney.

(No Model.) 2 Sheets—Sheet 2.
E. A. REED.
COMBINED STEAMER AND ROASTER.
No. 374,755. Patented Dec. 13, 1887.
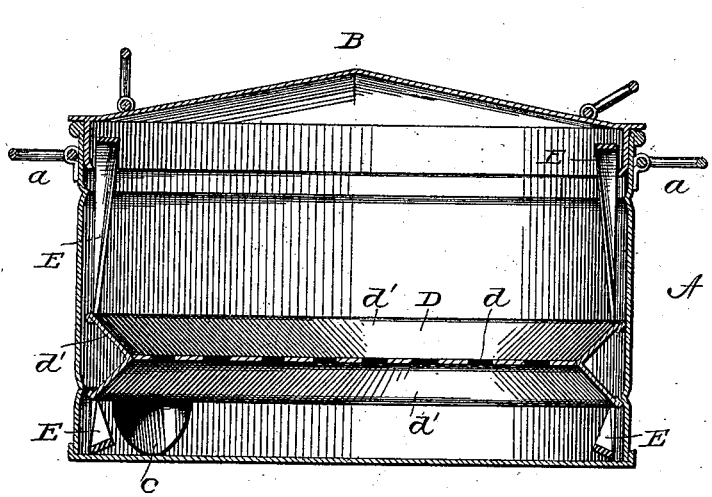
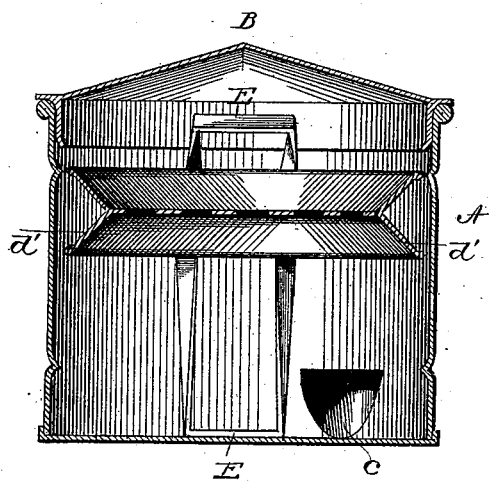
Witnesses:
Inventor:
Elizabeth A. Reed,
by
her Attorney.

UNITED STATES PATENT OFFICE.

ELIZABETH A. REED, OF CHICAGO, ILLINOIS.

COMBINED STEAMER AND ROASTER.

SPECIFICATION forming part of Letters Patent No. 374,755, dated December 13, 1887.

Application filed January 10, 1887. Serial No. 223,927. (No model.)

*To all whom it may concern:*

Be it known that I, ELIZABETH A. REED, a citizen of the United States, residing at Chicago, in the county of Cook and State of Illinois, have invented certain new and useful Improvements in a Combined Steamer and Roaster; and I do hereby declare the following to be a full, clear, and exact description of the invention, such as will enable others skilled in the art to which it appertains to make and use the same.

This invention relates to cooking apparatus.

The objects are to provide a utensil which, by a slight change of its internal arrangement, may be utilized for baking, roasting, boiling, or steaming in the preparation of food, which will prevent waste of heat or loss of aroma of the food while cooking, which will enable the cook readily to make an addition to the water in the pan, when necessary, without removing the cover, which will economize space and facilitate turning in the oven, and which will at the same time be simple, cheap, and economic in construction.

With these objects in view the invention consists in a combined steamer and roaster embracing a pan of suitable shape with a closely-fitting cover, the pan being provided near one end and upon its outer side with a spout communicating at its lower end with the interior for admission of water, said spout having a hinged cover to prevent the escape of steam or vapors.

Furthermore, the invention consists in a combined steamer and roaster embracing a pan of suitable shape with closely-fitting cover, and provided with a spout for the admission of water, said pan containing a tray with open bottom, and having a flange upon each side and loops or projections attached to each end, the loops upon one side of the tray being of greater length than the loops upon the opposite side, the said loops or projections serving alternately as handles or legs; and, finally, the invention consists in various novel details of construction whereby the objects of the invention are attained.

It is a well-known fact that in the ordinary methods of cooking a large proportion of the richest flavors of meats and poultry is wasted, being carried off in vapor, and that there is necessity of basting and constant attention; but by the invention herein shown I have endeavored to provide a utensil which will overcome these difficulties and will effectively accomplish the required result.

I have illustrated the invention in the accompanying drawings, in which—

Figure 2:
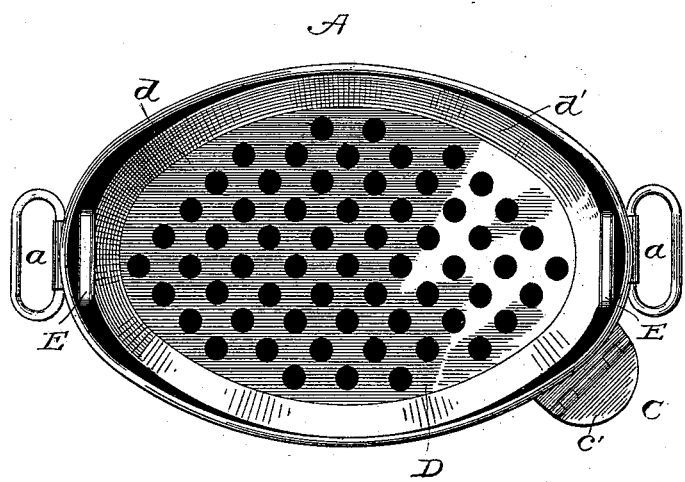

Figure 1 represents a side elevation of my invention, showing the spout for the admission of water. Fig. 2 is a plan view with the cover removed. Fig. 3 is a vertical longitudinal section of the invention with the tray in position for roasting or baking; and Fig. 4 is a vertical transverse section with the tray reversed and in position to be used as a steamer.

A represents the pan, which is preferably oval in shape, may be of any desired depth or length, has handles $a$ at each end, and is provided with a closely-fitting cover, B. Near one end of the pan, and upon its outer side, is provided a spout, C, which extends the full depth of the pan and communicates with its interior through an opening, $c$, in its side at the lower end of the spout. The spout is used for the admission of water to the pan, and obviates necessity of removing the cover of the pan. It has a hinged cover, $c'$, to prevent the escape of vapors or aroma of the food while cooking.

Upon the inside of the pan A is placed a removable tray or rack, D, which is composed of the plate $d$, perforated, reticulated, or foraminous, and of the same shape as the bottom of the pan, with flanges $d'$ $d'$ extending obliquely from each side, the outer edges lying closely against the sides of the pan. At each end or any other suitable portion of the tray, and fastened to its flanges, are pieces of metal, E, formed into loops having flattened ends. These loops serve the double purpose of handles, by which the tray and its contents may readily be removed from the pan without breaking the article being cooked or having to use a fork, and also serve as rests or legs for the support of the tray to raise it above the water in the bottom of the pan. The loops upon one side of the tray are of greater length than those upon the opposite side, so that when reversed the tray will occupy a position at greater or less depth in the pan to allow a larger or smaller quantity of water to be used, according to the nature of the article to be cooked.

When the utensil is to be used for roasting meats, game, poultry, &c., the tray is placed in the covered pan upon the shorter loops or rests, thus bringing the plate near the bottom of the pan, a sufficient quantity of water having been placed beneath it to cover the opening leading from the spout upon the outside of the pan. The water will prevent burning and keep the meat or fowl moist while cooking.

When the utensil is to be used as a steamer, or in cooking vegetables, puddings, dumplings, &c., the tray is reversed or placed upon its longer rests or loops and a larger quantity of water placed beneath it.

The invention is especially adapted to the roasting of meats, game, and poultry, which are rendered more tender and richer than when cooked in the ordinary way, as they are roasted in their own juices, the vapors arising being condensed on the cover of the pan and constantly falling back upon and being reabsorbed by them, preventing the necessity of basting, and necessarily keeping them moist and tender. The pan being closely covered, none of the aroma is wasted in the oven. The tight cover is also very serviceable while roasting fish or steaming onions, as the odors are retained and prevented from escaping into the room, while additional water may be admitted through the spout.

Having thus fully described my invention, what I claim as new, and desire to secure by Letters Patent, is—

1. In a combined steamer and roaster, a tray having a perforated bottom, flanges extending obliquely from each side of the bottom and surrounding the same to allow the tray to be reversed for use, and loops secured to the flanges at the ends of the tray to serve the purpose of legs or handles, according to the position occupied by the tray in the pan, the loops upon one side of the tray being of greater length than the loops upon its opposite side to give the tray greater or less depth in the pan when reversed, substantially as and for the purpose specified.

2. A combined steamer and roaster having a spout for the admission of water and containing a tray for the support of the article to be cooked, said tray having loops with flattened ends attached thereto for the purpose of serving alternately as handles or legs, the loops upon one side of the tray being of greater length than the loops upon its opposite side, to give the tray greater or less depth in the pan, substantially as specified.

3. In combination with a steamer and roaster having a spout upon its outer side communicating with the interior of the pan for the admission of water to the pan, and a hinged lid upon said spout to prevent the escape of vapors or odors, a reversible tray or rack having a perforated bottom for the support of the article to be cooked, flanges extending obliquely from each side of the bottom and surrounding the same, and loops secured to the flanges at each end of the tray, the loops upon one side being of greater length than the loops upon its opposite side, whereby reversing the tray will give it greater or less depth in the pan, as desired, substantially as and for the purpose set forth.

In testimony whereof I affix my signature in presence of two witnesses.

ELIZABETH A. REED.

Witnesses:
HIRAM V. REED,
PLATT MCDONALD.